Patented Nov. 14, 1939

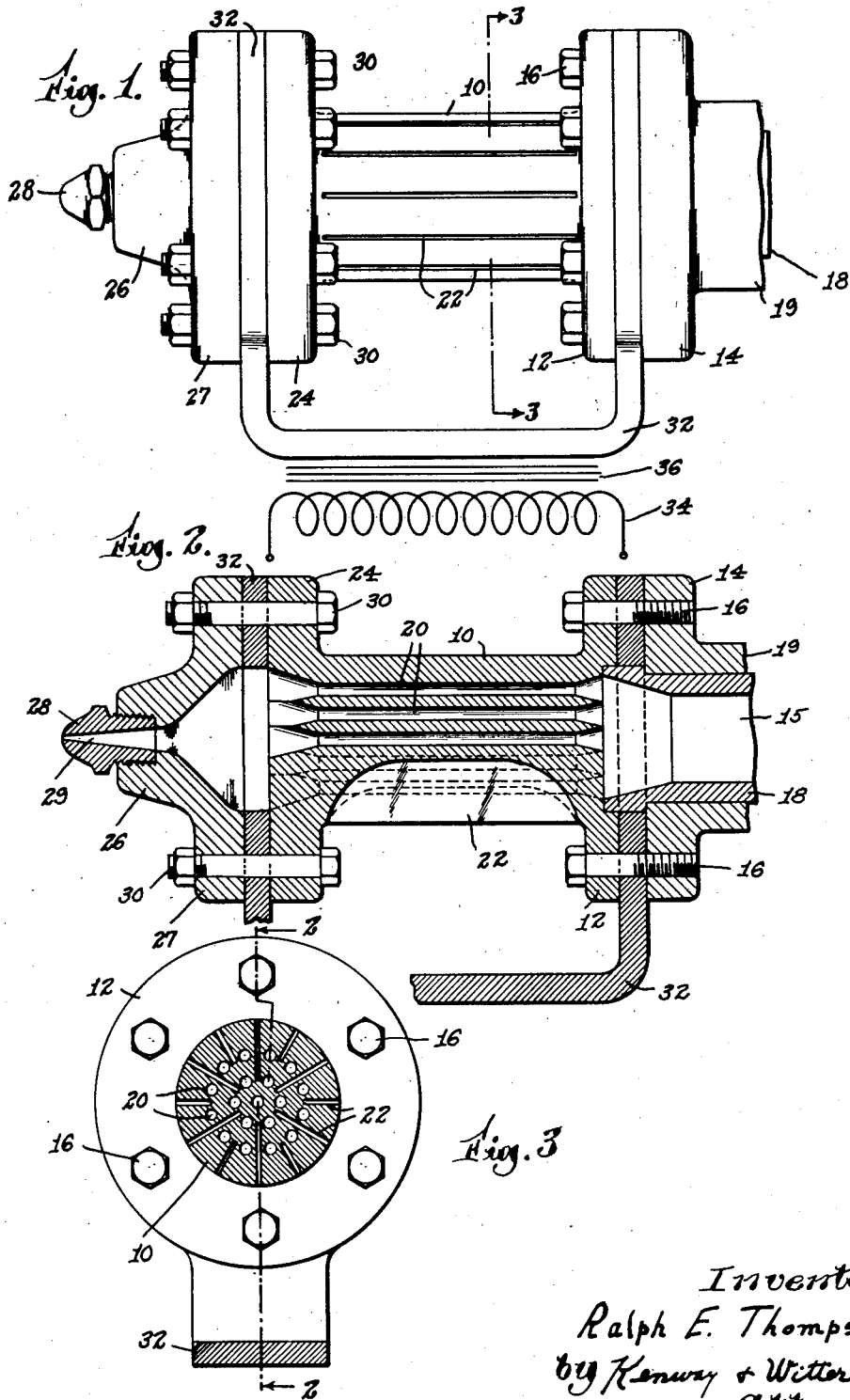

2,179,968

UNITED STATES PATENT OFFICE 2,179,968

APPARATUS FOR TREATING MOLDABLE MATERIALS

Ralph E. Thompson, Brookline, Mass.

Application February 23, 1938, Serial No. 192,073

5 Claims. (Cl. 219—39)

This invention consists in a novel apparatus for heating and softening thermoplastic materials preparatory to molding. A large number of these materials require heat treatment to render them sufficiently workable to be injected under pressure into molds.

In general practice, apparatus is employed for this purpose which includes a hopper for the reception of the material in powdered or granular form, a piston for compressing the material and forcing it through a heated conduit, and an injection nozzle discharging into the mold. Heretofore the conduit has been provided with a centrally disposed core, or "pineapple" which distributes the material being delivered in the shape of a ring, thus increasing the surface area of the material and tending to effect uniform heating of the mass. However, such apparatus demands skilled attendance and the heating is not satisfactorily uniform in operation. I have invented an improved process and apparatus for heating molding material directly prior to its injection through a nozzle, which secures much greater uniformity of heating than has heretofore been obtained, and which does not require the attendance of a skilled operator.

An important object of my invention is to heat, without burning, a mass of moldable material uniformly and in a short space of time in order to reduce it to workable condition.

A further object of my invention is to increase the capacity of molding apparatus by providing a heating unit which is more efficient in point of time and uniformity of heat distribution than heating units now in use. An improved advantage in the heating unit results from the fact that it may be applied to existing apparatus without expensive alterations.

In one aspect my invention comprises a novel process which consists in passing moldable material through tubular passages in a conduit formed of material having electric heating resistance and included as a resistance element in a circuit operating from a low voltage circuit, the mass of molding material being thus broken up into relatively small portions as it is forced into the conduit with the result that the surface area of the mass is greatly increased, and uniform heating is easily obtained.

The apparatus of my invention may comprise a conduit body disposed in a molding apparatus between the compression chamber and the nozzle and equipped with a conductor in the form of a U-shaped metal band clamped to the ends of the conduit and included as a secondary circuit of a step-down transformer. The material of the conduit possesses higher specific resistance than the conductor and is heated to high temperatures when low voltage high amperage current from a suitable source is passed through it. A plurality of slots are preferably cut into the body of the conduit in order to distribute the skin effect and promote an even and uniform heat, when alternating current is employed. When direct current is employed, there is no necessity of providing slots.

By the term "moldable materials", I mean all substances used in manufacturing molded articles, which require heat treatment. Phenol condensates, formaldehyde resins, Bakelite, wax, and cellulose derivatives are examples of the class of substances which may effectively be used in molding apparatus employing my invention. These and other features of my invention will be more easily understood and appreciated from the following detailed description of the specific embodiment thereof selected for purposes of illustration and shown on the accompanying drawing in which:

Fig. 1 is a view in side elevation of a conduit and nozzle constructed according to my invention and including a diagrammatic showing of the transformer.

Fig. 2 is a view in longitudinal cross section of the structure shown in Fig. 1 on the line 2—2 of Fig. 3.

Fig. 3 is a view in cross section on the line 3—3 of Fig. 1.

The conduit 10 is shown as connected to an annular flange 14 on the end of a compression chamber 15. The material to be molded is drawn from hoppers to the chamber 15, whereupon a piston (not shown) forces it into the conduit 10 where it is to be heated. After the material leaves the conduit 10, it is ejected from the apparatus through a tapered nozzle 28 which registers with the inlet orifice of a mold (not shown).

The conduit 10 is cylindrical in shape and may be formed of steel or other tough metal. Integral with the ends of the conduit 10 are annular attaching flanges 12 and 24. The flange 12 is attached by bolts 16 to a corresponding flange 14 integral with the end of the compression chamber 15 which is formed by hollow, cylindrical walls 18 and 19. Within the body of the conduit 10 are small tubular passages 20 formed in concentric rows and flared at each end. Radial slots 22 are cut into the conduit 10 and disposed among the passages 20 so that every passage is adjacent at least two of the slots 22.

A nozzle housing 26 having an integral attaching flange 27 is secured by bolts 30 to the flange 24 on the conduit 10. Threaded into the nozzle housing 26 is a nozzle 28 which is provided with an elongated tapered passage 29.

A broad, U-shaped band 32 of copper or other material of high electrical conductivity is cut out at each end as a gasket and is clamped by its ends to the conduit 10 adjacent to flanges 12 and 24 and held in position by bolts 16 and 30. The conduit 10 is thus disposed between the walls of the band 32. The bottom of the U-shaped band 32 is shown as incorporated as the secondary circuit of a step-down transformer which includes a primary winding 34 and a core 36. The transformer is designed to induce an electric current in the band 32 having a low voltage and very high amperage. The current flows through the band 32, and the conduit 10 is heated to high temperature because of its resistance. Since the property known as "skin effect", which is exhibited by large bodies when conducting alternating current, tends to concentrate the current at the surface, I prefer to provide radial slots 22 in the conduit 10 to obtain uniform distribution of the current throughout the body of the conduit 10 and in close proximity to the passages 20 through which molded material is delivered to the nozzle 28. Every portion of the molding material is thus placed in intimate contact with heated surfaces which render it workable and sufficiently plastic to take the shape of a mold when injected therein under pressure. Various moldable materials require different temperatures, but a machine equipped with a conduit constructed according to my invention is capable of treating all types of moldable material since the temperature of the conduit may easily be regulated by conventional means. Having thus described and illustrated my invention, what I claim as new and desire to secure by Letters Patent of United States is:

1. An apparatus for treating thermo-plastic material, which comprises an elongated one-piece conduit provided with a plurality of concentric rows of small bore passages and radial slots adjacent said passages, a U-shaped band of conducting material having its ends clamped to the ends of said conduit, and a transformer circuit including said U-shaped band and said conduit in the secondary circuit.

2. An apparatus for heating moldable material, which comprises a conduit provided with a plurality of axially disposed streamlined passages and radial slots adjacent thereto, a transformer circuit, and a U-shaped band of copper connected to the ends of said conduit and serving with said conduit as the secondary circuit of said transformer.

3. An apparatus for heating moldable material, which comprises a conduit disposed between the nozzle and the compression chamber of a molding apparatus and provided with axially disposed streamlined passages and radial slots adjacent thereto, attaching flanges integral with said conduit at each end thereof, and a transformer, and a U-shaped band of copper clamped to said attaching flanges and serving as a part of the secondary circuit of the transformer, energization of said transformer serving to heat said conduit, said radial slots serving to prevent eddy currents and evenly distribute heat throughout said conduit.

4. An apparatus for heating moldable materials, which comprises a conduit formed of a single piece of steel provided with axially disposed concentric rows of small passages and a plurality of slots adjacent thereto and spaced from the ends of the conduit, a transformer, and means co-operating with said transformer to heat said conduit by its resistance to electricity, said slots serving to distribute heat evenly throughout the conduit.

5. An apparatus for heating moldable material, which comprises an elongated conduit of metal provided with a plurality of radial slots spaced from its ends and a plurality of longitudinal tubular passages evenly distributed in the conduit adjacent said radial slots, a transformer circuit, and means connected to the ends of said conduit for including it in the secondary circuit of said transformer.

RALPH E. THOMPSON.